United States Patent
Okochi et al.

(10) Patent No.: US 11,330,829 B2
(45) Date of Patent: May 17, 2022

(54) OIL OR FAT FOR TEMPERING TYPE CHOCOLATE

(71) Applicant: FUJI OIL HOLDINGS INC., Osaka (JP)

(72) Inventors: Masako Okochi, Ibaraki (JP); Masayuki Matsui, Ibaraki (JP); Chie Nagashima, Ibaraki (JP); Chika Aramaki, Ibaraki (JP)

(73) Assignee: FUJI OIL HOLDINGS INC., Osaka (JP)

( * ) Notice: Subject to any disclaimer, the term of this patent is extended or adjusted under 35 U.S.C. 154(b) by 627 days.

(21) Appl. No.: 15/026,251

(22) PCT Filed: Oct. 1, 2014

(86) PCT No.: PCT/JP2014/076299
§ 371 (c)(1),
(2) Date: Mar. 31, 2016

(87) PCT Pub. No.: WO2015/050165
PCT Pub. Date: Apr. 9, 2015

(65) Prior Publication Data
US 2016/0213021 A1    Jul. 28, 2016

(30) Foreign Application Priority Data
Oct. 6, 2013   (JP) .............................. JP2013-209747

(51) Int. Cl.
*A23G 1/36* (2006.01)
*C11C 3/10* (2006.01)
*A23D 9/007* (2006.01)
*A23D 9/02* (2006.01)

(52) U.S. Cl.
CPC .............. *A23G 1/36* (2013.01); *A23D 9/007* (2013.01); *A23D 9/02* (2013.01); *C11C 3/10* (2013.01); *A23V 2002/00* (2013.01)

(58) Field of Classification Search
None
See application file for complete search history.

(56) References Cited

U.S. PATENT DOCUMENTS

| 7,396,855 | B2 * | 7/2008 | Setchell ................. | A61K 8/498 514/456 |
| 2010/0222607 | A1 * | 9/2010 | Arimoto ............... | C11B 7/0025 554/211 |
| 2011/0008499 | A1 | 1/2011 | Akahane et al. | |

FOREIGN PATENT DOCUMENTS

| EP | 0376628 | 7/1990 |
| JP | 05-146251 | 6/1993 |
| JP | 06-022691 | 2/1994 |
| JP | 2001-103930 | 4/2001 |
| JP | 2003153650 | 5/2003 |
| JP | 2010-268749 | 12/2010 |
| JP | 2013147456 | 8/2013 |
| JP | 2013-201989 | 10/2013 |
| JP | 2014-117257 | 6/2014 |
| WO | 2004/057983 | 7/2004 |
| WO | 2009/057451 | 5/2009 |
| WO | 2009150951 | 12/2009 |

OTHER PUBLICATIONS

Gledhill: Analysis of Soy Isoflavones is a Dietarty Supplement . . . ; copyright/published 2007 by the Walters Corporation (Year: 2007).*
MY: Yoshizawa: Oil-and-Fat Composition for Ice Coating; JP 2010-268749 (Adeka Corporation); publication: Dec. 12, 2010. (Year: 2010).*
AOCS: 102nd Annual Meeting; article by Kuwabara on p. 96, citation of Aug. 3, 2010 (Year: 2010).*
Lumor: Enzymatic Modification of Palm Olein and Palm Kernel Oil Blend to Produce Structured Lipids: a Study of Reaction Parameters; A Dissertation Submitted to the Graduate Faculty of The University of Georgia in Partial Fulfillment of the Requirements for the Degree; Athens, Georgia 2005 (Year: 2005).*
"International Search Report (Form PCT/ISA/210)", dated Dec. 22, 2014, with English translation thereof, pp. 1-4, in which four of the listed references (JP2010-268749, WO2009/057451, JP2014-117257 and JP2013-201989) were cited.
"Office Action of European Counterpart Application", dated Apr. 12, 2017, p. 1-p. 6, in which the listed references were cited.
"Office Action of Indonesia Counterpart Application" dated Mar. 15, 2018, with English translation thereof, p. 1-p. 4.
"Substantive Examination Report of Philippines Counterpart Application", dated Feb. 12, 2019, p. 1-p. 4.
"Office Action of Europe Counterpart Application," dated Oct. 22, 2018, p. 1-p. 6.
"Office Action of European Counterpart Application" dated Feb. 28, 2018, p. 1-p. 4.
Yun-Shi Fan, "2. Automatic color cake production line", Cold drink production technique, with English translation thereof, China Light Industry Press, Jan. 2008, pp. 226-229.
"Office Action of China Counterpart Application," with English translation thereof, dated Aug. 14, 2019, p. 1-p. 18.
Office Action of China Counterpart Application, with English translation thereof, dated Mar. 13, 2019, pp. 1-14.
Jiabin Liu et al., "Antioxidant Properties of Soybean Isoflavone Extract and Tofu in Vitro and in Vivo," Journal of Agricultural and Food Chemistry, vol. 53, Issue 6, Feb. 2005, pp. 2333-2340.
"Office Action of China Counterpart Application," with English translation thereof, dated Nov. 27, 2019, p. 1-p. 18.
"Decision of Rejection of China Counterpart Application", dated Apr. 14, 2020, with English translation thereof, pp. 1-15.
Office Action of Brazil Counterpart Application, with partial English translation thereof, dated Jun. 29, 2021, pp. 1-9.
Office Action of Brazil Counterpart Application, with English translation thereof, dated Nov. 26, 2021, pp. 1-5.

* cited by examiner

Primary Examiner — Patricia A George
(74) Attorney, Agent, or Firm — JCIPRNET

(57) ABSTRACT

An oil or fat for tempering type chocolate capable of enhancing and maintaining original flavors (milk taste, sweet taste, and cacao flavor, etc.) of chocolate is described, being obtained by blending therein 0.3 to 15% of a randomly transesterified oil of which a raw material is an oil or fat having a content of saturated fatty acids of 5 to 50% in the constituent fatty acids thereof and by further containing 5 to 50 ppm of malonyl isoflavone glycoside. A chocolate in which the oil or fat is blended is also described.

5 Claims, No Drawings

OIL OR FAT FOR TEMPERING TYPE CHOCOLATE

FIELD OF THE INVENTION

The invention relates to an oil or fat for tempering type chocolate capable of enhancing and maintaining flavors such as milk taste, sweet taste, and cacao flavor, etc. that are required for chocolate, and also to a chocolate in which the oil or fat is blended.

DESCRIPTION OF THE RELATED ART

A chocolate in which a tasteless and odorless oil or fat for tempering type chocolate is blended is poorer in flavors of chocolate, such as milk taste, sweet taste, and cacao flavor, etc., as compared to a so-called pure chocolate in which no such oil or fat is blended. As a result, a problem exists in that the flavors become weak. The most general solution to this problem is seasoning through addition of a commercially available chocolate spice or a flavor such as vanilla. However, it is not easy to work on natural chocolate flavors; in addition, the flavors of chocolate tend to be top notes and do not last in the mouth.

In an attempt to solve the above problem, seasoning is performed by blending a flavor oil in chocolate. There is, e.g., a method of blending in chocolate a cacao flavor oil that is produced by bringing a cacao raw material into contact with hard butter at high temperature (Patent Document 1), or a method of blending in chocolate a milk flavor oil that is produced by bringing milk powder and sugar into contact with a vegetable oil or fat at high temperature (Patent Document 2). However, the flavors produced by both methods are somewhat different from natural original flavors of chocolate and are thus unsatisfactory. Another problem is that the production processes are complicated.

On the other hand, among chocolates, white chocolate or milk chocolate provides a delicious taste by combining a strong milk taste with meltability of the chocolate in the mouth. These chocolates with a strong milk taste are in high demand and great need on the market. Since it is necessary to blend a large amount of milk fat-containing milk powder in these chocolates, in many cases, a tempering hard butter having a relatively high melting point is blended in large amount to remedy melting-point depression (reduction in heat resistance of chocolate) caused by mixing with milk fat. After all, the problem that the flavors as chocolate become weak still exists.

PRIOR-ART DOCUMENTS

Patent Documents

Patent Document 1: JPH05-146251 A
Patent Document 2: JPH06-22691 A
Patent Document 3: JP 2001-103930 A
Patent Document 4: WO 2004/057983 A1

SUMMARY OF THE INVENTION

Problems to be Solved by the Invention

An object of the invention is to provide an oil or fat for chocolate capable of enhancing and maintaining natural original flavors (milk taste, sweet taste, and cacao flavor, etc.) of chocolate, and to provide a chocolate in which the oil or fat is blended.

Means for Solving the Problems

As a result of earnest studies to solve the above problems, the inventors of this invention have found it possible to solve the problems by a simple method of using an oil or fat for tempering type chocolate, in which a randomly transesterified oil, of which the raw material is an oil or fat having a content of saturated fatty acids of 5 to 50% in the constituent fatty acids thereof, is blended in a proportion of 0.3 to 15%. Thereby, the inventors have completed the invention.

That is, the invention relates to the following items.

Item 1 is an oil or fat for tempering type chocolate which is obtained by blending therein 0.3 to 15% of a randomly transesterified oil of which the raw material is an oil or fat having a content of saturated fatty acids of 5 to 50% in its constituent fatty acids.

Item 2 is the oil or fat for chocolate of item 1 in which the oil or fat as the raw material of the randomly transesterified oil is a palm fractionated soft-part oil or fat having an iodine value of 55 to 75.

Item 3 is the oil or fat for chocolate of item 1 or 2 which is characterized by containing 5 to 50 ppm of malonyl isoflavone glycoside.

Item 4 is a chocolate obtained by blending therein the oil or fat for chocolate of items 1 to 3.

Item 5 is a method of enhancing and maintaining a flavor of chocolate, including blending in an oil or fat for tempering type chocolate that is obtained by blending therein 0.3 to 15% of a randomly transesterified oil of which the raw material is an oil or fat having a content of saturated fatty acids of 5 to 50% in its constituent fatty acids.

Effects of the Invention

Although tempering type hard butter of the invention is tasteless and odorless, in terms of exhibition of effects of enhancing expression of natural original flavors of chocolate that originate from cacao mass, cocoa, cocoa butter, milk powder and sugar, etc. blended in the chocolate at the same time and easily maintaining the flavors in the mouth, the invention is a groundbreaking technique clearly distinguishable from the conventional seasoning methods based on flavors or flavor oils.

DESCRIPTION OF THE EMBODIMENTS

Hereinafter, the invention is described in details.

The content of the saturated fatty acids in the constituent fatty acids of the oil or fat used as the raw material of the randomly transesterified oil of the invention must be 5 to 50%, preferably 20 to 50%, more preferably 25 to 45% and even more preferably 30 to 40%. In addition, the saturated fatty acids have a carbon number of preferably 16 to 22, more preferably 16 to 18.

If the content of saturated fatty acids exceeds 50%, 1,2-saturated-3-unsaturated or 2,3-saturated-1-unsaturated triglyceride components in the transesterified oil increase so that tempering property or food texture of a chocolate that uses the oil or fat for chocolate of the invention are affected adversely. If the content is less than 5%, the flavor enhancement and maintaining effects on the chocolate are insufficient.

The oil or fat used as the raw material of the randomly transesterified oil of the invention is not particularly limited as long as the content of saturated fatty acids is within the above range. Examples thereof include: vegetable oils or fats, such as soybean oil, rapeseed oil, corn oil, cottonseed oil, peanut oil, sunflower oil, rice bran oil, carthamus oil, safflower oil, olive oil, sesame oil, palm oil, coconut oil, and palm kernel oil, etc.; animal fats, such as beef tallow, and lard, etc.; and single processed oils or fats obtained by subjecting the above to fractionation or hydrogenation, etc., or a combined oil or fat thereof. Among the above, a palm fractionated low-melting-part oil or fat is particularly suitable.

The palm fractionated low-melting-part oil or fat suitable as the oil or fat used as the raw material of the randomly transesterified oil of the invention has an iodine value of preferably 55 to 75, more preferably 60 to 70 and even more preferably 64 to 73. If the iodine value is less than 55, 1,2-saturated-3-unsaturated or 2,3-saturated-1-unsaturated triglyceride components in the transesterified oil increase so that the tempering property or food texture of the chocolate that uses the oil or fat for chocolate of the invention are affected adversely. If the iodine value exceeds 75, the flavor enhancement and maintaining effects on the chocolate are insufficient.

The method of performing the above random transesterification may be one using a chemical catalyst, or one using an enzyme. The chemical catalyst may be an alkali metal catalyst such as sodium methylate. Examples of the enzyme include Lipase QLM (by Meito Sangyo Co., Ltd.), etc. The enzyme may be used as being immobilized on an ion-exchange resin or diatomaceous earth by a well-known method, or may be used in powder form.

The blending amount of the randomly transesterified oil in the oil or fat for chocolate of the invention is preferably 0.3 to 15%, more preferably 0.5 to 10%, even more preferably 1 to 7% and most preferably 2 to 5%. A blending amount exceeding 15% is unfavorable because the food fixture of the chocolate would become too soft or the tempering property of the chocolate would deteriorate. If the blending amount is less than 0.3%, the flavor enhancement and maintaining effects on the chocolate are insufficient.

The oil or fat for chocolate of the invention is obtained by blending the randomly transesterified oil in cacao butter, CBE or an oil or fat obtained by arbitrarily mixing the above. Here, CBE means a tempering type oil or fat called cacao butter equivalent that contains 1,3-disaturated-2-unsaturated triglyceride (saturated: saturated fatty acids having a carbon number of 16 to 22; unsaturated: oleic acid) as a main component. This oil or fat can be exemplified by oils or fats synthesized by a transesterification technique using a natural raw material such as palm oil, shea fat, illipe fat or sal fat, etc., an enzyme and so on, fractionated oils thereof and mixed oils or fats thereof, etc.

The blending amount of the oil or fat for chocolate of the invention in the chocolate of the invention is not particularly limited, but is preferably 1% or more, more preferably 3% or more, even more preferably 5% or more and most preferably 10% or more to exhibit the flavor enhancing/maintaining effects of the invention to a great extent. The chocolate of the invention includes any one of the following: dark chocolate, made by using cacao mass, cocoa powder, a saccharide such as sugar, an oil or fat such as cocoa butter, an emulsifier and a spice, etc. as raw materials; milk chocolate, made by using, e.g., cacao mass, cocoa powder, a saccharide such as sugar, an oil or fat such as cocoa butter, a dairy product such as whole milk powder, an emulsifier and a spice, etc. as raw materials; white chocolate, made by using, e.g., a saccharide such as sugar, an oil or fat such as cocoa butter, a dairy product such as whole milk powder, an emulsifier and a spice, etc.; and color chocolate, obtained by coloring white chocolate with a coloring and seasoning the same with a spice. In addition, according to the cacao content, the chocolate is also classified into: chocolate (cacao content: 35% or more), quasi chocolate (cacao content: 15% or more), milk chocolate (cacao content: 21% or more), quasi milk chocolate (cacao content: 7% or more), chocolate coating as a chocolate food (cacao content: 8% or more), chocolate coating using a dairy product (cacao content: 5% or more), and also white coating or color coating containing no cacao component. The range of the chocolate of the invention includes all of the above.

Since the invention can enhance and maintain natural original flavors of chocolate that originate from cacao mass, cocoa, cocoa butter, milk powder and sugar, etc. by means of the oil or fat of the invention, even if the milk powder blended in the chocolate is little, a certain level of effect is shown with respect to the milk taste. Nevertheless, to expect a greater effect, the milk powder such as skimmed milk powder or whole milk powder accounts for preferably 5% or more, more preferably 10% or more and most preferably 20% or more, of the chocolate composition. For the same reason, to expect great enhancing/maintaining effects on the cacao flavor, the cacao solid content accounts for preferably 10% or more, more preferably 20% or more and most preferably 30% or more, of the same composition.

Arbitrary components such as a coloring agent, an emulsifier, an antioxidant, and a spice, etc. generally used for confectionery production can be suitably added to the oil or fat for chocolate of the invention. The addition amount of the above is 20 wt % or less and preferably 10 wt % or less relative to the oil or fat for chocolate of the invention.

Examples of the above emulsifier include fatty acid esters of glycerine, fatty acid esters of sucrose, fatty acid esters of sorbitan, organic acid fatty acid esters of glycerine, fatty acid esters of polyglycerine, lecithin, etc.

The range of the malonyl isoflavone glycoside used in the invention includes malonyldaidzin, malonylgenistin, etc. that are confirmed to exist as main components of the isoflavone compounds in a soybean. In the invention, such water-soluble and oil-insoluble malonyl isoflavone glycoside can be contained in the oil or fat.

The malonyl isoflavone glycoside used in the invention can be, e.g., one contained in an isoflavone compound powder made from soy pulp or defatted soybean, which is described in Patent Document 3, or one contained in an isoflavone-containing composition extracted and concentrated from soybean hypocotyl, which is described in Patent Document 4. Due to the oil-insolubility, the content of the malonyl isoflavone glycoside in the above isoflavone-containing composition is preferably 10 wt % or more, more preferably 20 wt % or more and most preferably 30 wt % or more. If the content is 10 wt % or less, the oil or fat that contains the malonyl isoflavone glycoside easily becomes turbid, which is therefore unfavorable.

In addition, though the isoflavone-containing composition that contains the malonyl isoflavone glycoside contains isoflavone glycoside or aglycone, etc., it can be used in the invention without problems if only the content of malonyl isoflavone glycoside is as above.

The invention is directed to an oil or fat for chocolate that contains a specific amount of malonyl isoflavone glycoside. A chocolate that uses the oil or fat for chocolate exhibits a flavor enhancement effect. The content of the malonyl isoflavone glycoside is preferably 5 to 50 ppm, more preferably 10 to 50 ppm and most preferably 20 to 50 ppm. A content of malonyl isoflavone glycoside of less than 5 ppm is unfavorable for the flavor enhancement effect would be insufficient. If the content exceeds 50 ppm, no greater flavor enhancement effect can be exhibited, so there is no need to contain the malonyl isoflavone glycoside in an amount above the upper limit. Otherwise, a bitter taste or off-taste may occur unfavorably.

The flavor enhancement effect of the invention made by blending in the randomly transesterified oil is exhibited during melting of chocolate in the mouth, and also exhibited in maintaining the flavors of chocolate for long time after the chocolate is melted in the mouth.

Similarly, a main effect of containing the malonyl isoflavone glycoside of the invention is a flavor enhancement effect during melting of chocolate in the mouth, and by blending in the randomly transesterified oil and containing the malonyl isoflavone glycoside at the same time, the effect is exhibited to a greater extent.

The oil or fat for chocolate of the invention containing the malonyl isoflavone glycoside can be obtained by adding and mixing, in an oil or fat, an isoflavone-containing composition containing the malonyl isoflavone glycoside. Methods of adding and mixing the isoflavone-containing composition are not particularly limited. For example, the oil or fat for chocolate that contains the malonyl isoflavone glycoside can be obtained by adding a specified amount of a 1% aqueous solution of an isoflavone-containing composition in an oil or fat heated to 70° C., and stirring at 50 to 180° C. under a reduced pressure of 0.5 to 100 Torr for 15 to 1 hour to perform sufficient dehydration. The concentration of the aqueous solution of the isoflavone-containing composition is preferably 0.1 to 22 wt %, more preferably 1 to 10 wt %. It is unfavorable if the lower limit is not reached, for the amount of water relative to the oil or fat increases so that the dehydration takes long time. It is also unfavorable if the upper limit is exceeded, for crystals of malonyl isoflavone glycoside and so on would precipitate so that the content thereof in the oil or fat is reduced. The temperature is preferably 50 to 180° C. It is unfavorable if the lower limit is not reached, for the dehydration would take long time. It is also unfavorable if the upper limit is exceeded, for the malonyl isoflavone glycoside would decompose to reduce its effect. The reduced pressure is preferably 0.5 to 100 Torr, and a better flavor can be obtained with the reduced pressure being as low as possible. In addition, in an alternative way, in a refining process of the oil or fat, after the dehydration process is finished, the isoflavone-containing composition is added in powder form, and after that, stirring is performed at 100 to 190° C. under a reduced pressure of 0.5 to 100 Torr for 15 min to 1 hour, followed by filtration, and thereby a clear oil or fat containing malonyl isoflavone glycoside can be obtained. In this case, a temperature during the stirring treatment is preferably 100 to 190° C. If the temperature is lower than 100° C., malonyl isoflavone glycoside cannot be contained in the oil or fat; if the temperature exceeds 190° C., there is a possibility that malonyl isoflavone glycoside may be oxidized and decomposed. The temperature during the stirring treatment is more preferably 130 to 150° C. The time for the stirring treatment is preferably 30 to 120 min, more preferably 90 min or more. If the stirring treatment continues significantly longer than 120 min, oxidation and decomposition of the malonyl isoflavone glycoside may easily occur.

In addition, it is desired to perform filtration after the stirring, by using a suitable filter material such as a filter cloth or a membrane filter, to form an oil or fat having a clear appearance. In order to prevent oxidation of the oil or fat, the temperature of the oil or fat during the filtration is 40 to 100° C., preferably 50 to 80° C. Moreover, in a process of containing the malonyl isoflavone glycoside in the oil or fat, an emulsifier such as a fatty acid ester of polyglycerine, a fatty acid ester of sucrose, a monoglyceride of an organic acid, or lecithin, etc. can be added, if necessary. In terms of flavor, the addition amount of such emulsifier is preferably 3 wt % or less, more preferably 1 wt % or less.

(Quantitative Method for Isoflavones)

A sample corresponding to 1 to 10 mg of isoflavones was precisely weighed, and 25 mL of 70% (v/v) ethanol was added thereto. After extraction with stirring for 30 min at room temperature, an extract was obtained by centrifugation. The residue was further subjected to the same extraction operation twice. Extracts from a total of three times of the extraction operation were adjusted to a constant volume of 100 mL with 70% (v/v) ethanol, and filtered with a 0.45 μm PVDF filter to obtain a test solution.

A confirmation test for the isoflavones was carried out by confirming peaks having almost the same retention times by using 12 kinds of standards, i.e., daidzin, genistin, glycitin, daidzein, genistein, glycitein, malonyl daidzin, malonyl genistin, malonyl glycitin, acetyl daidzin, acetyl genistin and acetyl glycitin (from Wako Pure Chemical Industries, Ltd.). A quantitative test was carried out by quantifying 12 kinds of isoflavone concentrations (in terms of daidzin values) using the daidzin standard, and true isoflavone concentrations were calculated by multiplying the obtained values by the following quantification coefficients.

The quantification coefficients of the isoflavones are respectively 1.000 for daidzin, 0.814 for genistin, 1.090 for glycitin, 1.444 for malonyl daidzin, 1.095 for malonyl genistin, 1.351 for malonyl glycitin, 1.094 for acetyl daidzin, 1.064 for acetyl genistin, 1.197 for acetyl glycitin, 0.583 for daidzein, 0.528 for genistein, and 0.740 for glycitein. The amount of the isoflavones was obtained from the sum of the various isoflavone concentrations. Moreover, HPLC conditions of the test solutions and standard solutions are as follows. The content of the malonyl isoflavone glycoside was calculated from the total amount of malonyl daidzin, malonyl genistin and malonyl glycitin.

(HPLC Conditions)

Column: YMC-Pack ODS-AM-303 (4.6×250 mm)
Mobile phase: liquid A: acetonitrile:water:acetic acid=15:85:0.1 (v/v/v)
  liquid B: acetonitrile:water:acetic acid=35:65:0.1 (v/v/v)
  liquid A→liquid B: linear concentration gradient (50 min)
Flow rate: 1.0 ml/min
Temperature: 25° C.
Detection: UV 254 nm
Injection volume: 10 μl

EXAMPLES

The examples of the invention are shown below, which are not intended to limit the invention. In the examples, "part" and "%" mean a weight basis unless otherwise specified.

Experimental Example 1

Preparation of StOSt-Containing Fat 30 weight parts of a high oleic acid sunflower oil having a content of oleic acid of 86% in the constituent fatty acids and 70 weight parts of ethyl stearate were mixed with each other, followed by transesterification using a 1,3-position selective lipase to obtain a reaction oil. Ethyl ester was distilled away from this reaction oil by distillation, a solvent separation was performed using acetone, and refining was performed with a conventional method. Thus, a StOSt (triglyceride having stearic acid bonded at positions 1 and 3 and oleic acid bonded at position 2)-containing fat was obtained.

Experimental Example 2

Preparation of Randomly Transesterified Oil

A palm fractionated soft-part oil or fat having a content of saturated fatty acids of 35% in the constituent fatty acids thereof and an iodine value of 68 was subjected to random transesterification using sodium methylate, followed by refining with a conventional method to obtain a randomly transesterified oil.

Test Example 1

Effect of Blending in Randomly Transesterified Oil

NEWSS7 (trade name: Melano NEWSS7, by Fuji Oil Co., Ltd.) being a general cocoa butter equivalent was used as the oil or fat of Test Example 1. In addition, after the oils or fats of Examples 1 to 7 and Comparative Examples 1 and 3 were obtained by blending therein the StOSt-containing fat of Experimental Example 1, a palm medium-melting part oil or fat (having an iodine value of 34) and the randomly transesterified oil of Experimental Example 2 in the manners shown in Table 1, a milk chocolate material was prepared by a conventional method according to the composition shown in Table 2. This material was further subjected to a tempering treatment, then placed in a mold and cooled at about 5° C. for 30 min. Then, the resultant was removed from the mold and aged at 20° C. for 1 week. Thereafter, a taste evaluation was carried out. Here, by suitably adjusting the blending amounts of the StOSt-containing fat and the palm medium melting portion oil or fat in Table 1 so that the obtained milk chocolate at a product temperature of 20° C. has a chew solidity equivalent to that of the chocolate obtained in Comparative Example 1, the various chocolates in Test Example 1 can be subjected to the taste evaluation with the same solidity. Moreover, the taste evaluation was carried out according to the following criteria. The results are shown in Table 3.

(Taste Evaluation of Chocolate)

The tastes of the chocolates were evaluated through a 10-grade sensory evaluation by 10 panelists, taking milk taste, sweet taste and duration of flavors of chocolate in the mouth as evaluation items.

The chocolate evaluated as 3 or higher in all of the items was determined to have good flavor enhancement and maintaining effects.

Milk taste: the greater the number, the stronger the milk taste; the smaller the number, the weaker the milk taste.

Sweet taste: the greater the number, the stronger the sweet taste; the smaller the number, the weaker the sweet taste.

Duration of flavors of chocolate in the mouth: the greater the number, the longer the duration; the smaller the number, the shorter the duration.

TABLE 1

Composition of Oils or Fats in Test Example 1

| | |
|---|---|
| Comparative Example 1 | MELANO NEWSS7. No addition of the randomly transesterified oil of Experimental Example 2. |
| Example 1 | The StOSt-containing fat + the palm medium melting portion oil or fat + the randomly transesterified oil of Experimental Example 2 (0.3% blended) |
| Example 2 | The StOSt-containing fat + the palm medium melting portion oil or fat + the randomly transesterified oil of Experimental Example 2 (0.5% blended) |
| Example 3 | The StOSt-containing fat + the palm medium melting portion oil or fat + the randomly transesterified oil of Experimental Example 2 (2% blended) |
| Example 4 | The StOSt-containing fat + the palm medium melting portion oil or fat + the randomly transesterified oil of Experimental Example 2 (5% blended) |
| Example 5 | The StOSt-containing fat + the palm medium melting portion oil or fat + the randomly transesterified oil of Experimental Example 2 (7% blended) |
| Example 6 | The StOSt-containing fat + the palm medium melting portion oil or fat + the randomly transesterified oil of Experimental Example 2 (10% blended) |
| Example 7 | The StOSt-containing fat + the palm medium melting portion oil or fat + the randomly transesterified oil of Experimental Example 2 (15% blended) |
| Comparative Example 3 | The StOSt-containing fat + the palm medium melting portion oil or fat + the randomly transesterified oil of Experimental Example 2 (20% blended) |

TABLE 2

Composition of Milk Chocolate

| | Blending (part) |
|---|---|
| Cacao mass | 22.3 parts |
| Whole milk powder | 13.3 parts |
| Sugar | 42.0 parts |
| Cocoa butter | 12.4 parts |
| Oil or fat of Examples or Comparative examples | 10.0 parts |
| Lecithin | Proper amount |

TABLE 3

Taste Evaluation of Chocolates of Test Example 1

| | Blending amount (%) of the randomly transesterified oil of Experimental Example 2 | Taste evaluation on chocolate | | | |
|---|---|---|---|---|---|
| | | Milk taste | Sweet taste | Duration of flavors of chocolate in the mouth | Sensory performance |
| Comparative Example 1 | 0.0 | 2 | 2 | 2 | A refreshing flavor was sensed, and no aftertaste occurred after the chocolate had melted in the mouth. |

TABLE 3-continued

Taste Evaluation of Chocolates of Test Example 1

| | Blending amount | Taste evaluation on chocolate | | | |
|---|---|---|---|---|---|
| | (%) of the randomly transesterified oil of Experimental Example 2 | Milk taste | Sweet taste | Duration of flavors of chocolate in the mouth | Sensory performance |
| Example 1 | 0.3 | 4 | 3 | 4 | The milk taste and sweet taste were enhanced, and the flavors lasted. |
| Example 2 | 0.5 | 4 | 3 | 5 | The milk taste and sweet taste were enhanced, and the flavors lasted. |
| Example 3 | 2.0 | 5 | 4 | 6 | The milk taste was strong, rich flavors were sensed, and the flavors lasted after the chocolate had melted in the mouth. |
| Example 4 | 5.0 | 5 | 4 | 7 | The milk taste was strong, rich flavors were sensed, and the flavors lasted after the chocolate had melted in the mouth. |
| Example 5 | 7.0 | 6 | 6 | 7 | The milk taste was strong, rich flavors were sensed, and the flavors lasted after the chocolate had melted in the mouth. |
| Example 6 | 10.0 | 7 | 7 | 8 | The milk taste was strong, rich flavors were sensed, and the flavors lasted after the chocolate had melted in the mouth. |
| Example 7 | 15.0 | 7 | 7 | 8 | The milk taste was strong, rich flavors were sensed, and the flavors lasted after the chocolate had melted in the mouth. |
| Comparative Example 3 | 20.0 | 7 | 7 | 8 | The milk taste was strong, rich flavors were sensed, and the flavors lasted after the chocolate had melted in the mouth. However, the texture was soft and physical properties were impaired. |

As the blending amount of the randomly transesterified oil of Experimental Example 2 increased from Example 1 to Example 7, the milk taste, the sweet taste and the duration of flavors were evaluated to be higher and better.

However, the chocolate of Comparative Example 3, in which 20% of the randomly transesterified oil was blended, softened and had impaired physical properties of chocolate, and was therefore inferior. In addition, the detachability from the mold was reduced as compared to the other examples, and deterioration in the tempering property was observed.

Test Example 2

Effect of Containing Malonyl Isoflavone Glycoside

An oil or fat obtained by mixing 98 parts of Melano NEWSS7 with 2 parts of a palm fractionated low-melting part oil or fat (having an iodine value of 67) was used as the oil or fat of Comparative Example 2. A proper amount of a 1.5% aqueous solution of isoflavone-containing composition (trade name: Soyaflavone HG, produced by Fuji Oil Co., Ltd., having a content of malonyl isoflavone glycoside of 41.3%) was added to 3,000 g of the oil or fat obtained by mixing 98 parts of Melano NEWSS7 with 2 parts of the palm fractionated low-melting part oil or fat (having an iodine value of 67) and heated to 70° C. The resultant was stirred at 120° C. under a reduced pressure of 2 Torr and processed for 30 min for sufficient dehydration. Consequently, the oil or fat of Example 8 that contained 6.2 ppm of malonyl isoflavone glycoside, the oil or fat of Example 9 that contained 14.9 ppm of malonyl isoflavone glycoside, the oil or fat of Example 10 that contained 18.6 ppm of malonyl isoflavone glycoside, the oil or fat of Example 11 that contained 26.0 ppm of malonyl isoflavone glycoside, the oil or fat of Example 12 that contained 37.2 ppm of malonyl isoflavone glycoside, and the oil or fat of Comparative Example 4 that contained 62.0 ppm of malonyl isoflavone glycoside were obtained. The oils or fats of Examples 8 to 12 and Comparative Examples 2 and 4 were used to produce milk chocolate similarly to Test Example 1, and a taste evaluation was carried out. The results are shown in Table 4.

TABLE 4

Taste Evaluation of Chocolates of Test Example 2

| | Content of malonyl isoflavone glycoside (ppm) | Taste evaluation on chocolate | | | |
|---|---|---|---|---|---|
| | | Milk taste | Sweet taste | Duration of flavors of chocolate in the mouth | Sensory performance |
| Comparative Example 2 | 0.0 | 1 | 1 | 1 | A highly refreshing flavor was sensed, and no aftertaste occurred after the chocolate had melted in the mouth. |
| Example 8 | 6.2 | 4 | 4 | 3 | The milk taste and sweet taste were enhanced. |

TABLE 4-continued

Taste Evaluation of Chocolates of Test Example 2

| | Content of malonyl isoflavone glycoside (ppm) | Taste evaluation on chocolate | | | |
|---|---|---|---|---|---|
| | | Milk taste | Sweet taste | Duration of flavors of chocolate in the mouth | Sensory performance |
| Example 9 | 14.9 | 5 | 4 | 3 | The milk taste was strong, and the sweet taste was also enhanced. |
| Example 10 | 18.6 | 6 | 5 | 3 | The milk taste was strong, and the sweet taste was also enhanced. |
| Example 11 | 26.0 | 6 | 6 | 4 | The milk taste was strong, and rich flavors were sensed. |
| Example 12 | 37.2 | 7 | 7 | 4 | The milk taste was strong, and rich flavors were sensed. |
| Comparative Example 4 | 62.0 | 7 | 7 | 4 | A slightly bitter taste was sensed, and an off-taste was sensed. |

As the content of malonyl isoflavone glycoside increased from Example 8 to Example 12, particularly the milk taste and sweet taste were evaluated to be higher and better.

However, although Comparative Example 4 containing 62 ppm of malonyl isoflavone glycoside was highly evaluated in milk taste and sweet taste, the example was inferior since a bitter taste and an off-taste originating from malonyl isoflavone glycoside were sensed.

Test Example 3

Effect of Combined Use

The oils or fats of Comparative Example 1 and Examples 13 to 15 were obtained by blending therein or containing the randomly transesterified oil of Experimental Example 2 and malonyl isoflavone glycoside in the manners shown in Table 5 similarly to Test Examples 1 and 2. These oils or fats were used to produce milk chocolate similarly to Test Example 1, and a taste evaluation was carried out. The results are shown in Table 5.

From Examples 13 to 15, it was confirmed that by blending in the randomly transesterified oil and containing malonyl isoflavone glycoside at the same time, an even greater effect was exhibited.

Test Example 4

Evaluation on White Chocolate

The oils or fats of Comparative Example 2 and Example 16 were obtained by blending therein or containing the randomly transesterified oil of Experimental Example 2 and malonyl isoflavone glycoside in the manner shown in Table 6 similarly to Test Example 3. Further, a white chocolate material was prepared by using 30.0 parts of each of the oils or fats of Comparative Example 2 and Example 16, 26.0 parts of whole milk powder, 44.0 parts of sugar and a proper amount of lecithin as raw materials in accordance with a conventional method. This white chocolate material was further subjected to a tempering treatment, then placed in a mold and cooled at about 5° C. for 30 min. Then, the resultant was removed from the mold and aged at 20° C. for 1 week. Thereafter, a taste evaluation was carried out. The results are shown in Table 6.

TABLE 5

Taste Evaluation of Chocolates of Test Example 3

| | Blending amount of the randomly transesterified oil of Experimental Example 2 | Content of malonyl isoflavone glycoside (ppm) | Taste evaluation on chocolate | | | |
|---|---|---|---|---|---|---|
| | | | Milk taste | Sweet taste | Duration of flavors of chocolate in the mouth | Sensory performance |
| Comparative Example 1 | 0.0 | 0.0 | 2 | 2 | 2 | A refreshing flavor was sensed, and no aftertaste occurred after the chocolate had melted in the mouth. |
| Example 13 | 4.3 | 18.6 | 7 | 6 | 7 | The milk taste was strong, rich flavors were sensed, and the flavors lasted after the chocolate had melted in the mouth. |
| Example 14 | 10.0 | 26.0 | 8 | 7 | 8 | The milk taste was strong, rich flavors were sensed, and the flavors lasted after the chocolate had melted in the mouth. |
| Example 15 | 15.0 | 37.2 | 8 | 8 | 8 | The milk taste was strong, rich flavors were sensed, and the flavors lasted after the chocolate had melted in the mouth. |

TABLE 6

Taste Evaluation on White Chocolate

| | Blending amount (%) of the randomly transesterified oil of Experimental Example 2 | Content of malonyl isoflavone glycoside (ppm) | Taste evaluation on chocolate | | | |
|---|---|---|---|---|---|---|
| | | | Milk taste | Sweet taste | Duration of flavors of chocolate in the mouth | Sensory performance |
| Example 16 | 0.5 | 6.2 | 8 | 7 | 7 | A rich milk taste was sensed. The milk taste and sweet taste lasted and stayed in the mouth. |
| Comparative Example 2 | 0.0 | 0.0 | 2 | 2 | 2 | A refreshing flavor was sensed, and no aftertaste occurred after the chocolate had melted in the mouth. |

It was confirmed that the effects of the invention are also exhibited on white chocolate.

Test Example 5

Evaluation on Bitter Chocolate

Except that the composition of the white chocolate was replaced with the composition of bitter chocolate (10.0 parts of each of the oils or fats of Comparative Example 2 and Example 16, 40.0 parts of cacao mass, 47.0 parts of sugar, 3.0 parts of cocoa butter and a proper amount of lecithin), a taste evaluation was carried out similarly to Test Example 4. The results are shown in Table 7.

TABLE 7

Taste Evaluation on Bitter Chocolate

| | Blending amount of the randomly transesterified oil of Experimental Example 2 | Content of malonyl isoflavone glycoside (ppm) | Taste evaluation on chocolate | | | |
|---|---|---|---|---|---|---|
| | | | Milk taste | Sweet taste | Duration of flavors of chocolate in the mouth | Sensory performance |
| Example 16 | 0.5 | 6.2 | 0 | 5 | 5 | A rich milk taste was sensed. The milk taste and sweet taste lasted and stayed in the mouth. |
| Comparative Example 2 | 0.0 | 0.0 | 0 | 1 | 2 | A refreshing flavor was sensed, and no aftertaste occurred after the chocolate had melted in the mouth. |

Since no milk powder was blended in the bitter chocolate using Example 16, the milk taste was of course evaluated as 0, but good flavors of chocolate were obtained.

It was confirmed that the effects of the invention are also exhibited on bitter chocolate.

What is claimed is:

1. A fat for tempering chocolate, consisting of:
   0.3 to 15% of a randomly transesterified oil; and
   cacao butter, cacao butter equivalent, or a mixture of cacao butter and cacao butter equivalent,
   wherein a content of saturated fatty acids of a raw material of the randomly transesterified oil is 5 to 50% in constituent fatty acids thereof, and the raw material of the randomly transesterified oil is a soft palm oil fraction having an iodine value of 55 to 75.

2. A fat for tempering chocolate, consisting of:
   0.3 to 15% of a randomly transesterified oil, wherein a content of saturated fatty acids of a raw material of the randomly transesterified oil is 5 to 50% in constituent fatty acids thereof, and the raw material of the randomly transesterified oil is a soft palm oil fraction having an iodine value of 55 to 75;
   cacao butter, cacao butter equivalent, or a mixture of cacao butter and cacao butter equivalent; and
   5 to 50 ppm of malonyl isoflavone glycoside.

3. A chocolate obtained by blending the fat for tempering chocolate of claim 1 with a raw material of chocolate.

4. A method of enhancing and maintaining a flavor of chocolate, comprising:
   blending a fat for tempering chocolate with a raw material of chocolate,
   wherein the fat for tempering chocolate consisting of:
   0.3 to 15% of a randomly transesterified oil; and
   cacao butter, cacao butter equivalent, or a mixture of cacao butter and cacao butter equivalent,
   wherein a content of saturated fatty acids of a raw material of the randomly transesterified oil is 5 to 50% in constituent fatty acids thereof, and the raw material of the randomly transesterified oil is a soft palm oil fraction having an iodine value of 55 to 75.

5. A chocolate obtained by blending the fat for tempering chocolate of claim 2 with a raw material of chocolate.

* * * * *